US012808776B2

United States Patent

(12) United States Patent
Chen et al.

(10) Patent No.: US 12,808,776 B2
(45) Date of Patent: Nov. 24, 2026

(54) SAMPLE SORTING DEVICE AND METHOD

(71) Applicants: MGI Tech Co., Ltd., Shenzhen (CN); EGI Tech (Qing Dao) Co., Limited, Shandong (CN)

(72) Inventors: I-Jane Chen, San Jose, CA (US); Jon Bartman, San Jose, CA (US); Paul Lundquist, Oakland, CA (US)

(73) Assignees: MGI Tech Co. Ltd., Shenzhen (CN); EGI Tech (Qing Dao) Co., Limited, Shandong (CN)

( * ) Notice: Subject to any disclaimer, the term of this patent is extended or adjusted under 35 U.S.C. 154(b) by 675 days.

(21) Appl. No.: 18/259,456

(22) PCT Filed: Mar. 10, 2022

(86) PCT No.: PCT/CN2022/080146

§ 371 (c)(1),
(2) Date: Jun. 27, 2023

(87) PCT Pub. No.: WO2022/194020

PCT Pub. Date: Sep. 22, 2022

(65) Prior Publication Data

US 2024/0053252 A1 Feb. 15, 2024

Related U.S. Application Data

(60) Provisional application No. 63/162,442, filed on Mar. 17, 2021.

(51) Int. Cl.

| | |
|---|---|
| ***G01N 15/14*** | (2024.01) |
| *G01N 15/10* | (2006.01) |
| *G01N 15/149* | (2024.01) |

(52) U.S. Cl.

CPC ..... *G01N 15/1459* (2013.01); *G01N 15/1425* (2013.01); *G01N 2015/1006* (2013.01); *G01N 15/149* (2024.01)

(58) Field of Classification Search

CPC ........... G01N 15/1459; G01N 15/1425; G01N 15/149; G01N 2015/1006

See application file for complete search history.

(56) References Cited

U.S. PATENT DOCUMENTS 5,032,381 A * 7/1991 Bronstein .......... G01N 15/1459 435/19
6,540,895 B1 * 4/2003 Spence .................. G01N 15/14 204/600

(Continued)

FOREIGN PATENT DOCUMENTS

CN 104140926 A 11/2014
CN 105400738 A 3/2016

(Continued)

OTHER PUBLICATIONS

KR20080089835 English translation (Year: 2008).*

(Continued)

*Primary Examiner* — Charles Capozzi
*Assistant Examiner* — Michael Stanley Gzybowski
(74) *Attorney, Agent, or Firm* — Kilpatrick Townsend & Stockton LLP

(57) ABSTRACT

A device for sorting cells includes a rotatable substrate (601) configured to rotate around a rotation axis (611) to generate a centrifugal force and a cover layer (441) attached to the rotatable substrate (601). The rotatable substrate (601) includes a sample reservoir (602) disposed at the center of the rotatable substrate (601), a flow path (604) coupled to the sample reservoir (602) and extending radially towards a periphery of the rotatable substrate (601) and including a bifurcation (606) into a main channel (607) and a side channel (608). The rotatable substrate (601) moves a plurality of cells stored in the sample reservoir (602) to a periphery of the rotatable substrate (601) by a centrifugal force. The cover layer (441) includes a first opening in fluid (Continued)

communication with the main channel (607) and a second opening in fluid communication with the side channel (608).

12 Claims, 14 Drawing Sheets

(56) References Cited

U.S. PATENT DOCUMENTS

| | | | | |
|---|---|---|---|---|
| 2004/0229349 | A1* | 11/2004 | Daridon | G02B 21/32 435/305.2 |
| 2009/0035847 | A1 | 2/2009 | Cho et al. | |
| 2010/0282611 | A1* | 11/2010 | Kim | C12M 33/00 204/643 |
| 2014/0341788 | A1 | 11/2014 | Kim et al. | |

FOREIGN PATENT DOCUMENTS

| | | | | |
|---|---|---|---|---|
| CN | 109837204 A | | 6/2019 | |
| KR | 20080089835 A | * | 10/2008 | G01N 35/10 |

OTHER PUBLICATIONS

International Application No. PCT/CN2022/080146, International Search Report and Written Opinion mailed on Jun. 9, 2022, 11 pages.

International Application No. PCT/CN2022/080146, International Preliminary Report on Patentability mailed on Sep. 28, 2023, 6 pages.

* cited by examiner

SAMPLE SORTING DEVICE AND METHOD

RELATED APPLICATIONS

This application is a national phase application of PCT Application No. PCT/CN2022/080146, filed Mar. 10, 2022, which claims the benefit of and priority to United States Provisional Patent Application No. 63/162,442 filed Mar. 17, 2021, the entire contents of which are hereby incorporated by reference.

TECHNICAL FIELD

The present invention relates to separating cells or other discrete samples using a centrifugal force and an electric field, and more particularly, to an apparatus, system, and method for sorting cells with a rotatable substrate for generating a centrifugal force and an electrode for generating a dielectrophoresis electric field to immobilize and divert target cells to a collection reservoir.

BACKGROUND

Collecting and isolating rare cells from samples, such as circulating tumor cells in cancer patient blood or fetal cells in pregnant women, are required in many medical applications. Diagnosing circulating tumor cells (CTC) and fetal cells (FTC) in maternal blood is a highly sensitive and non-invasive way to collect critical information on a patient and fetal health. A conventional apparatus for separating cells is a fluorescence assisted cell sorting (FACS) flow cytometer such as BD's FACSMelody™ cell sorter. Conventional FACS flow cytometers have a negative impact on cell viability and can cause a cell loss of greater than 50 percent. Optical tweezers, another option, can cause similar damage to cells. Another option, Johnson & Johnson's CellSearch® utilizes magnetic particles to conjugate with target cells and flow through a magnetic field, and has a low throughput. Further problematically, some researchers believe the conjugated magnetic beads alter the cell behaviors downstream. Miltenyi Biotec's MACSQuant® Tyto® cell sorter guides cells through a microfluidic channel and uses a diaphragm to deflect flow to push targeted cells to a collection reservoir. Although it has a low impact on the cell integrity, it does not have a multiplexing configuration. Another option is Silicon Biosystem's DEPArray NxT System, which uses dielectrophoresis (DEP). This platform embeds DEP in each disposable chip and is therefore expensive. Each chip is composed of 80,000 DEP cages and is limited to process 80,000 cells in each run and processes only 10 uL at a time. It is thus not very practical for collecting CTCs from a whole blood sample which contains around 100 target cells in every 10 million cells in every 1 mL of sample.

Therefore, there is a need in the art for a scalable cell sorter and method of operating and fabricating thereof that can sort target cells from a sample fluid with high throughput while preserving cell integrity.

BRIEF SUMMARY OF THE INVENTION

The present disclosure describes several exemplary embodiments of cell sorters and methods of fabricating and operating such cell sorters, some of which feature improved scalability and cell integrity. In some implementations, these cell sorters are operable to sort fluorescently labeled target cells from a sample fluid using a centrifugal force and dielectrophoresis. The present disclosure also provides applications such as cell sorting based on differentiating cell sizes or morphologies without utilizing fluorescent labels, sorting bacteria from drinking water after labeling the bacteria with antibody and fluorophore conjugated gold nanoparticles, and the like.

In one exemplary embodiment, a device for sorting cells includes a rotatable substrate configured to rotate around a rotation axis to generate a centrifugal force and a cover layer attached to the rotatable substrate. The rotatable substrate includes a sample reservoir disposed at the center of the rotatable substrate, a flow path coupled to the sample reservoir and extending radially towards a periphery of the rotatable substrate and including a bifurcation into a main channel and a side channel. The rotatable substrate moves a plurality of cells stored in the sample reservoir to a periphery of the rotatable substrate by a centrifugal force. The cover layer includes a first opening in fluid communication with the main channel and a second opening in fluid communication with the side channel.

In another exemplary embodiment, an apparatus for sorting cells includes a rotatable substrate and a stationary substrate. The rotatable substrate includes a sample reservoir for storing a plurality cells including target cells and waste cells, and a plurality of microfluidic channels radially coupled to the sample reservoir, each microfluidic channel including a bifurcation into a main channel and a side channel. The stationary substrate includes a power supply module configured to provide a plurality of electrical signals, and a plurality of height adjustable and individually addressable electrode pins coupled to the power supply module and configured to receive the plurality of electrical signals. The plurality of height adjustable and individually addressable electrode pins are disposed in a vicinity of the bifurcation in a ring pattern and in contact with the rotatable substrate when the rotatable substrate and the stationary substrate are brought together.

Embodiments of the present disclosure also provide a method of sorting cells in a sample having a plurality of waste cells and a plurality of target cells. The method includes preparing the plurality of target cells in the sample with a fluorophore-labeled antibody, providing the sample to a sample reservoir of a rotatable substrate having a flow path coupled to the sample reservoir, wherein the flow path includes a bifurcation into a main channel and a side channel, rotating the rotatable substrate to generate a centrifugal force to drive a portion of the sample from the sample reservoir into the flow path, detecting an optical signal from a target cell by an optical sensor, and generating a dielectrophoresis electric field for immobilizing the target cell in response to the detected optical signal.

Embodiments of the present disclosure also provide a sorting system. The system includes a rotatable substrate having at least one fluidic channel extending towards a periphery of the rotatable substrate and at least one branch fluidic channel extending off of the fluidic channel from a branch point, a detector configured to detect target units in a fluid in the fluidic channel at or upstream of the branch point, and an electric field source configured to generate an electric field at or proximate the branch point in response to the detector detecting a target unit. The system is configured to rotate the rotatable substrate to cause the fluid to flow through the fluidic channel towards the periphery of the rotatable substrate, and activate the electric field source in response to the detector detecting a target unit in the fluid such that the generated electric field facilitates diversion of the detected target into the branch fluidic channel.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

BRIEF DESCRIPTION OF THE DRAWINGS

The accompanying drawings form a part of the present disclosure that describe exemplary embodiments of the present invention. The drawings together with the specification will explain the principles of the invention. It should be understood that the drawings are not drawn to scale for purposes of clarity, and similar reference numbers are used for representing similar elements. The thickness of layers and regions in the drawings may be exaggerated for clarity. For example, the dimensions of some of the elements are exaggerated relative to other elements.

DETAILED DESCRIPTION OF THE INVENTION

As used herein, the terms "example embodiment," "exemplary embodiment," and "present embodiment" do not necessarily refer to a single embodiment, although it may, and various example embodiments may be readily combined and interchanged, without departing from the scope of the present invention. Furthermore, the terminology as used herein is for the purpose of describing example embodiments only and is not intended to be a limitation of the invention. The term "horizontal" as used in this application is defined as a plane parallel to the conventional plane or surface of a wafer or substrate, regardless of the orientation of the wafer or substrate. The term "vertical" refers to a direction perpendicular to the horizontal as defined above. Prepositions, such as "on", "side" (as in "sidewall"), "below", "above", "higher", "lower", "over" and "under" are defined with respect to the conventional plane or surface being on the top surface of the wafer or substrate, regardless of the orientation of the wafer or substrate. It will be understood that these terms are intended to encompass different orientations of the device in addition to the orientation depicted in the figures.

In the exemplary embodiments described herein, the terms bifurcation, branch point, and separation may be interchangeably used. The term bifurcation refers to a separation of a flow path into two separate paths or a branching out of a flow channel into a primary (main) channel and a secondary (side) channel. The term target cell, target particles, or target unit refers to a desired cell, a desired particle, or a desired unit that is separated from non-target cells (also referred to as waste cells) or non-target units. The term stationary substrate refers to the extent to which a substrate is not rotating or moving relative to a rotatable substrate.

Figure 1:
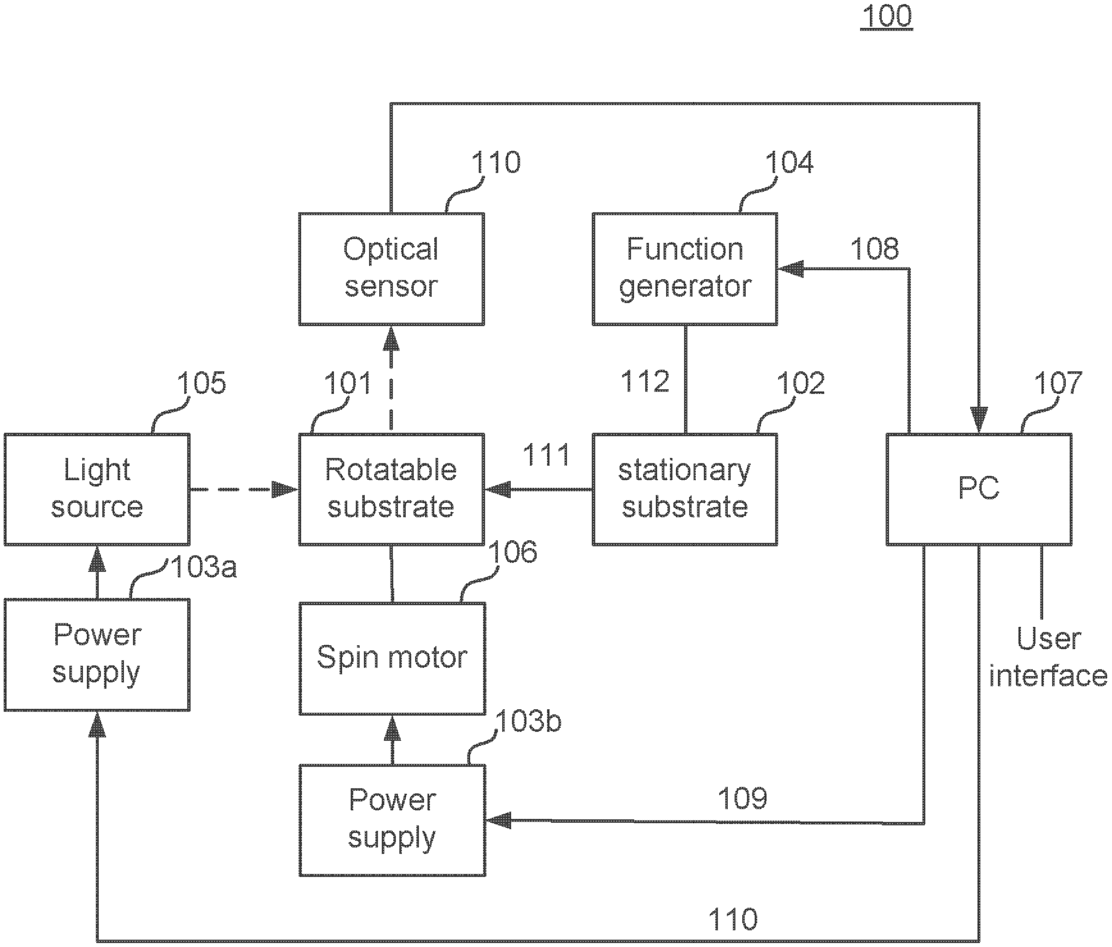
FIG. 1 is a simplified schematic diagram of one example of a system for sorting target cells according to an embodiment of the present disclosure.

FIG. 1 is a simplified schematic diagram of one example of a system 100 for sorting target cells in a liquid sample according to an embodiment of the present disclosure. The basic schematic block diagram of a target cell sorting system is exemplary and not intended to limit the present invention. A number of embodiments of the present invention that include a rotatable substrate and a stationary substrate configured to provide electrical signals to spring-loaded and individually addressable electrode pins in contact with the rotatable substrate are included within the scope of the invention. As described herein, embodiments of the present invention are particularly useful for commercial application to research institutes that require the sorting of target cells for biomedical analysis.

The system 100 of FIG. 1 includes, but is not limited to, a rotatable substrate 101, a stationary substrate 102, a power supply module 103, a function generator 104, a light source 105, and a spin motor 106 coupled to the rotatable substrate 101 and configured to rotate the rotatable substrate 101 with a revolution speed, thereby generating a centrifugal force for moving a fluid. The function generator module 104 and the stationary substrate 102 are electrically coupled to each other; therefore the outlets of the electrical signals generated by the function generator 104 are embedded in the stationary substrate. In one embodiment, the power supply module may have a first power module 103*a* electrically coupled to the light source 105, and a second power module 103*b* electrically coupled to the spin motor 106. In one embodiment, the rotatable substrate 101, the stationary substrate 102, the first power supply module 103*a*, the second power supply module 103*b*, the function generator module 104, and the light source 105 are configured to sort target cells in a fluidic sample (e.g., a biological or biochemical sample) using the centrifugal force through one or more channels integrated therein. As used herein, the terms "flow path" and "flow channel" are used interchangeably and refer to the portion of the path between the sample reservoir and the bifurcation.

The system 100 may also include a computing device 107 (e.g., a personal computer, a PDA, a laptop, and the like) for generating first control signals 108 to the function generator module 104, second control signals 109 to the second power supply 103*b* to drive the spin motor 106, third control signals 110 to the first power supply 103*a* for operating the light source 105, and for providing a user interface. The system 100 can prepare and control the operating conditions of the rotatable substrate 101, stationary substrate 102, the first power supply module 103*a*, the second power supply module 103*b*, the light source 105, and the spin motor 106, such as the revolution speed and rotation direction of the rotatable substrate 101, the magnitude and frequency of electrical signals 111 for generating a dielectrophoretic electric field to immobilize target cells disposed in the rotatable substrate 101.

In one embodiment, the rotatable substrate 101 includes a sample reservoir for receiving a fluid sample containing target cells and a channel coupled to the sample reservoir and extending to a periphery of the rotatable substrate. In one embodiment, the rotatable substrate 101 may include a transparent material with good chemical resistance to many solvents. The light source 105 is configured to provide a light beam for continuously or periodically illuminating a portion of the channel. The stationary substrate 102 includes a plurality of electrode pins, each electrode pin is configured to contact a surface portion of the rotatable substrate 101 to generate a dielectrophoretic electric field. The plurality of individually addressable electrode pins are coupled to the function generator module module 104 for receiving corresponding electrical signals 112. The rotatable substrate 101 and the stationary substrate 102 are in electrical contact with each other through the electrode pins that are mounted on the stationary substrate 102. Each of the electrode pins can be individually and independently driven by one of the electrical signals 112 provided by the function generator module 104.

The system 100 may further include an optical sensor 110 configured to detect an optical signal generated by a fluorophore-labeled target cell that flows through the channel in the rotatable substrate 101 under the light beam and activate (turn on) an electrical signal of the function generator module 104 in response to the detected optical signal. The activated electrical signal is configured to generate a dielectrophoretic electric field to immobilize the fluorophore-labeled target cell. In one embodiment, the system 100 can operate autonomously in an interactive mode with a user via a PC. These and other features of the system 100 will be described further in detail below.

Figure 2:
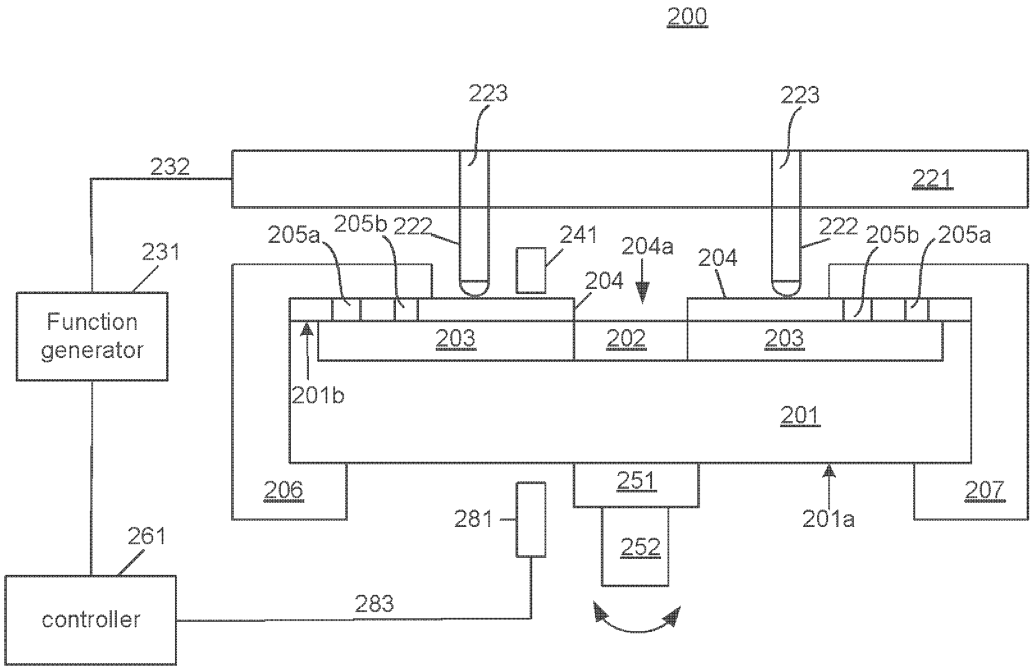
FIG. 2 is a simplified cross-sectional view diagram illustrating a cell sorting system according to an embodiment of the present disclosure.

FIG. 2 is a simplified cross-sectional view diagram illustrating a cell sorting system 200 according to an embodiment of the present disclosure. Referring to FIG. 2, the cell sorting system 200 includes a rotatable substrate 201 having a sample reservoir 202, a plurality of channels 203 coupled to the sample reservoir 202 and extending to a periphery of the rotatable substrate 201, and a top layer 204 having a plurality of through-holes 205*a*, 205*b* forming outlets for providing target cells and waste cells to a collection reservoir 206 and a waste reservoir 207, respectively. The rotatable substrate 201 is coupled to a vacuum chuck 251 that applies a suction force for attaching a spin motor 252 to an underside 201*a* of the rotatable substrate as to rotate the rotatable substrate. In one embodiment, the top layer 204 may be a glass plate that is disposed on a top surface 201*b* of the rotatable substrate 201. The top layer 204 has an opening 204*a* corresponding to the sample reservoir 202. Through the opening 204*a*, a liquid sample including target cells may be injected to the sample reservoir 202.

The cell sorting system 200 also includes a stationary substrate 221 electrically coupled to the rotatable substrate 201 through a plurality of electrode pins 222. A variation in the air gap between the rotatable substrate 201 and the stationary substrate 221 due to manufacturing process tolerance or other factors may degrade the electrical contact of the electrode pins. Therefore, each electrode pin has a spring-loaded contact to compensate for the air gap variation. In some embodiments, the electrode pin can be a McMaster-Carr spring-loaded guide pin having a zinc-plated steel head (www.mcmaster.com/pinsispring-load-guide-pins-7/) or a spring probe with the part number 101050 or 101247 (www.smithsinterconnect.com). In other embodiments, the plurality of electrode pins 222 may be set of pogo pins mounted on a surface of the stationary substrate 221 and configured to contact a surface of the top layer 204 when the stationary substrate 221 and the rotatable substrate 201 are brought together. The plurality of electrode pins 222 may be mounted through a plurality of through-holes 223 and coupled to a function generator module 231 that is configured to provided electrical signals 232 to the electrode pins 222 for generating a dielectrophoretic (DEP) electric field in the rotatable substrate 201 to immobilize target cells flowing through the channels 203.

In one embodiment, the top layer 204 is attached (e.g., using an adhesive) or otherwise joined to the upper surface 201*b* of the rotatable substrate 201 and configured to allow light from the light source 241 to pass through. In one embodiment, the heads of the electrode pins 222 are in physical contact with the top layer 204. In one embodiment, the stationary substrate 221 is mechanically coupled or physically attached to the rotatable substrate 201 using some holding elements. The spring-loaded electrode pins 222 are configured to adjust an uneven air space between the stationary substrate 221 and the rotatable substrate 201 to provide a uniform strength of the physical contact across the electrode pins 222. In one embodiment, the stationary substrate 221 is a printed circuit board (PCB) substrate, and the electrical signals 232 are provided to the electrode pins 222 through metal conductors in one or more metal layers in the PCB substrate.

In one embodiment, a liquid (fluid) sample is treated with fluorophore-labeled antibodies which only conjugate with target cells such as fluorophore labeled antiEpCAM. The target cells therefore can be optically differentiated from the rest of the sample. The liquid sample is then loaded or injected into the sample reservoir 202. The cell sorting system 200 also includes a light source 241 disposed in the vicinity of a periphery of the sample reservoir 202 and configured to provide a continuous light beam for illuminating a surface portion of the rotatable substrate 201. As the rotatable substrate 201 rotates by the spin motor 252, the centrifugal force drives the liquid (fluid) sample and the target cells into the channels 203. While a sample fluid flows through a region of an optical sensor 281 with constant light excitation; cells labeled with fluorophore emit fluorescence. The fluorescence emission is detected by the optical sensor 281 which then provides a trigger signal 283 to a controller 261 to turn on the power supply module 231, which provides an electrical signal to an associated electrode pin (DEP pin), thereby generating a dielectrophoretic electric field to immobilize fluorophore-labeled target cells within its effective region. The target cells and the non-target cells in the sample fluid can thus be separated and transferred by the centrifugal force through respective flow paths and outlets 205*a*, 205*b* to the collection reservoir 206 and waste reservoir 207 that are disposed in the periphery of the rotatable substrate 201. This is described in further detail in additional examples set out below. In one embodiment, the rotatable substrate 201 including the top layer 204, the collection reservoir 206, and the waste reservoir 207 is a single-use microfluid device, so that it is disposable, whereas the stationary substrate 221 is reusable. In one embodiment, the controller 261 and the function generator module 231 are mounted on a surface of the stationary substrate 221. In one embodiment, the controller 261 and the power supply module 231 are mounted on the same side of the stationary substrate 221. In another embodiment, the controller 261 and the power supply module 231 are mounted on an opposite side of the stationary substrate 221 facing away from the electrode pins. In one embodiment, the controller 261 may be a commercially available controller integrated circuit that is user-programmable, a general purpose digital processor, a field programmable gate array (FPGA), or a CMOS application specific integrated circuit (ASIC). It is to be understood that the relative positions of the rotatable substrate and the stationary substrate can be interchanged without affecting the function and operation of the cell sorting system 200, i.e., the rotatable substrate can be disposed above the stationary substrate without affecting the scope of the present invention.

Figure 3:
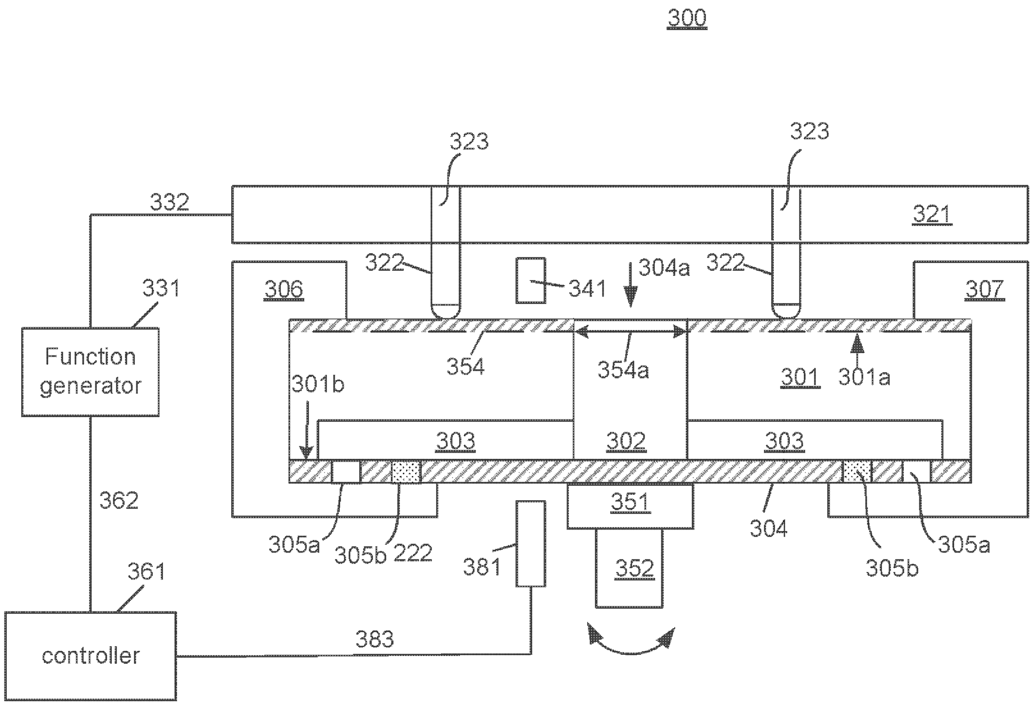
FIG. 3 is a simplified cross-sectional view diagram illustrating a cell sorting system according to another embodiment of the present disclosure.

FIG. 3 is a simplified cross-sectional view diagram illustrating a cell sorting system 300 according to another embodiment of the present disclosure. Referring to FIG. 3, the cell sorting system 300 is substantially similar to the system 200 except for the difference described herein. Accordingly, the description provided in relation to the elements illustrated in FIG. 2 is applicable to the elements illustrated in FIG. 3.

Specifically, as shown in FIG. 3, the system 300 includes a rotatable substrate 301 and a stationary substrate 321 having a set of spring-loaded pogo pins 322 in contact with a surface 301*a* of the rotatable substrate 301 when the stationary substrate 321 and the rotatable substrate 301 are brought together. In one embodiment, the pogo pins (spring-loaded electrical connector pins) are mounted on a surface of the stationary substrate 321. In another embodiment, the pogo pins are mounted to the stationary substrate 321 through the through-holes 323. Similarly to the system 200, the spring-loaded pogo pins are configured to adjust the air gap variation between the stationary substrate 321 and the rotatable substrate 301. The system 300 also includes a function generator module 331 in electrical contact with the pogo pins and configured to provide activate (turn on/off) signals 332 to the pogo pins to form an electric field and a controller 361 coupled to the power supply module to provide control signals 362 to the power supply module 331.

The rotatable substrate 301 has an opening (inlet) 304*a* for receiving a biological sample, one or more flow paths or channels 303 for transferring a portion of the biological sample to the periphery of the rotatable substrate 301, and a bottom layer 304 having a plurality of through holes (outlets) 305*a* and 305*b* in communication with a collection reservoir 306 and a waste reservoir 307, respectively. In one embodiment, the bottom layer 304 may be a glass plate that is attached (e.g., using an adhesive) or otherwise joined to the bottom surface 301*b* of the rotatable substrate 301. In one embodiment, the bottom layer may have the same material as that of the rotatable substrate 301 and is thermal bonded to the rotatable substrate 301. The system 300 further includes a collection reservoir 306 and a waste reservoir 307 disposed in the vicinity or a periphery of the rotatable substrate 301 and configurable to store target cells and waste cells that are moved to the periphery of the rotatable substrate by the centrifugal force.

The system 300 also includes a light source 341 configured to provide a continuous light beam and having a constant light intensity for illuminating a portion of the channel 303 for detecting target cells that are conjugated with fluorophore-labeled antibody. The system 300 further includes an optical sensor 381 disposed on the opposite side of the rotatable substrate and configured to provide a trigger signal 383 to the controller 361 indicating that a target cell has been detected.

In one embodiment, the system 300 may further include a second glass plate 354 (indicated as a dotted-line block) having an opening 354*a* matching the inlet 304*a*. The second lass plate may be attached (e.g., using an adhesive) to an upper surface 301*a* of the rotatable substrate 301 to provide mechanical support to the rotatable substrate for receiving the electrode pins 322. It will be appreciated that the second glass plate 354 is optional as the rotatable substrate 301 has sufficient hardness to withstand the the electrode pins 322 even when the rotatable substrate 301 rotates.

It will be appreciated that the embodiments of FIG. 2 and FIG. 3 are merely examples, which should not unduly limit the scope of the invention. One of ordinary skill in the art would recognize many variations, alternatives, and modifications. For example, the location of the light source 341 and the optical sensor 381 may be interchanged, i.e., the light source 341 may be disposed on the side of the bottom layer 304 and the optical sensor 381 may be disposed on the opposite side. Similar to the system 200, the rotatable substrate 301 is a single-use microfluid device, so that it is disposable, and the stationary substrate 321 is reusable. In one exemplary embodiment, the optical sensor may include an optical lens having a predetermined focal length for focusing the received light to the optical sensor and a filter operable to pass ultraviolet (UV) spectrum (e.g., 300 nm to 450 nm). In one embodiment, the optical sensor may include an optical filter for passing fluorescence emission wavelengths (e.g., ultra-violet wavelengths) and substantially blocking excitation light. In another exemplary embodiment, the stationary substrate 321 may be disposed on the other side of the rotatable substrate 301 facing the bottom layer 304. In yet another embodiment, the controller 361, the power supply 331, the optical sensor 381 may be mounted on the stationary substrate 321.

Figure 4A:
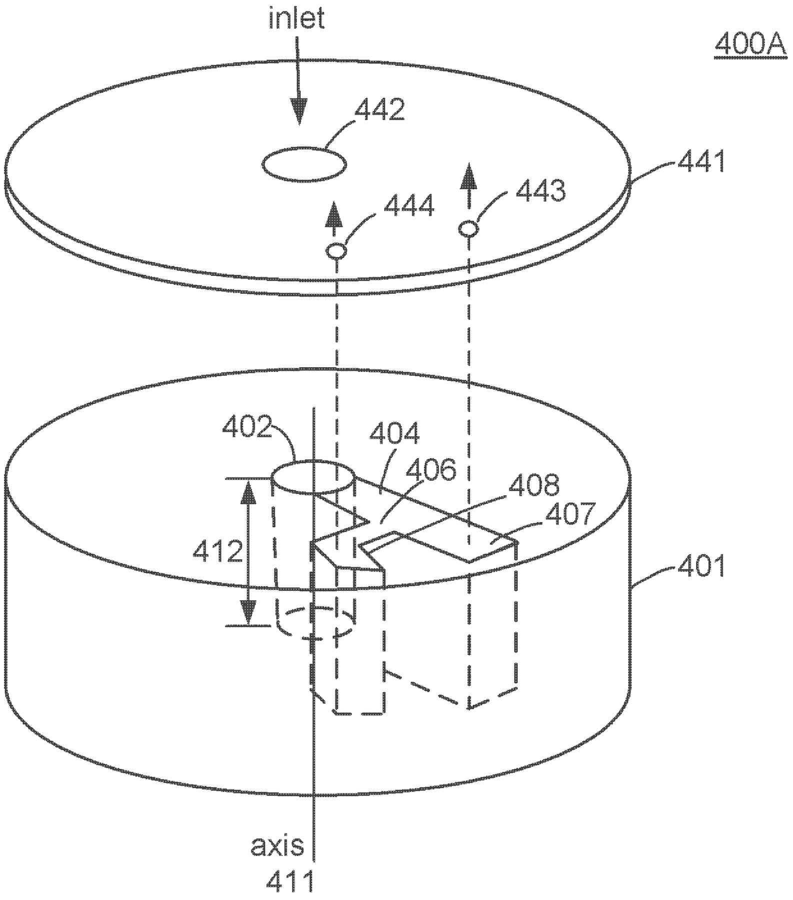
FIG. 4A is an exploded perspective view of an apparatus for sorting cells using a centrifugal force and a dielectrophoretic electric field according to an embodiment of the present disclosure.

FIG. 4A is an exploded perspective view of an apparatus 400A for sorting cells or target units using a centrifugal force and a dielectrophoretic electric field according to an embodiment of the present disclosure. Referring to FIG. 4A, the apparatus 400A includes a rotatable substrate 401 operable to rotate about a rotation axis 411 and a cover layer 441 disposed on an upper surface of the rotatable substrate 401. The rotatable substrate 401 includes a sample reservoir 402 having a depth or height 412 extending into the rotatable substrate 401 but not through the rotatable substrate, and a flow path (flow channel or primary fluidic channel) 404 coupled to the sample reservoir 402 and having a bifurcation (branch point) 406 disposed at a location between the sample reservoir 402 and a periphery of the rotatable substrate 401. The bifurcation (branch point) 406 includes a main channel (downstream of the primary fluidic channel at the bifurcation or branch point) 407 and a side channel (branch fluidic channel) 408. In one embodiment, the flow path (primary fluidic channel) 404 extends radially towards a periphery of the rotatable substrate 401, and the main channel 407 is a continuation of the flow path 404 along the same direction toward the periphery of the rotatable substrate 401. The location of the bifurcation 406 is the intersection point of the flow path 404, the main channel 407, and the side channel 408. It will be appreciated that the bifurcation location depends on the size (radius) of the rotatable substrate, the location of an optical sensor for detecting target cells, and the flow speed of the target cells (which is in turn a function of the rotation speed of the rotatable substrate and the mass of the target cells). This will be described in further detail in additional examples set out below.

The cover layer 441 has an inlet opening 442 for introducing a liquid sample to the sample reservoir 402 and a first outlet through-hole 443 for transferring waste cells in the main channel 407 to a waste reservoir and a second outlet through-hole 444 for transferring target cells in the side channel 408 to a collection reservoir. For this purpose, the first through-hole 443 is in fluid communication with the main channel 407, and the second through-hole 444 is in fluid communication with the side channel 408. Through these through-holes, the target cells and the waste cells (i.e., non-target cells which are the remaining fluid sample not containing target cells) are ejected or moved to the respective reservoirs through the centrifugal force when the rotatable substrate is rotated by a spin motor. It is to be understood that the configuration shown in FIG. 4A is merely an illustrative example, other configurations are also possible. In one exemplary embodiment, the outlets corresponding to the main channel and side channel can be extended through the sidewall of the rotatable substrate 401 and in fluidic communication with respective collection and waste reservoirs. In another exemplary embodiment, the sample reservoir 402, the flow path 404, the main channel 407, and the side channel 408 may have different depth or height.

Figure 4B:
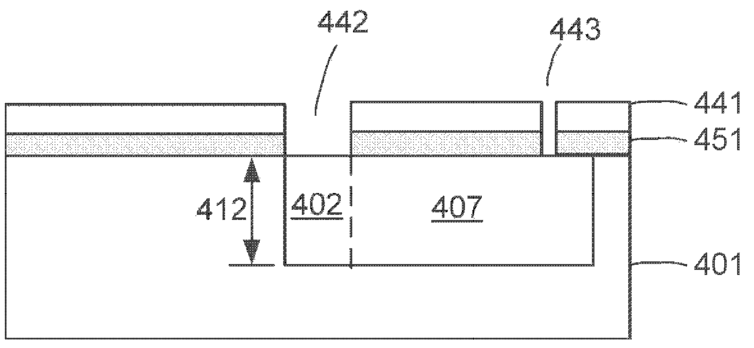
FIG. 4B is a cross-sectional view of the apparatus in FIG. 4A.

FIG. 4B is a cross-sectional view of the apparatus 400A according to an exemplary embodiment of the present disclosure. Referring to FIG. 4B, the cover layer 441 is attached to the rotatable substrate 401 using an adhesive layer 451 that forms a hermetic seal between the cover layer 441 and the rotatable substrate 401. In one embodiment, the adhesive layer 451 is compatible with the materials used in the rotatable substrate 401. The adhesive layer 451 includes the opening 442 matching the opening of the sample reservoir 402 and through-holes 442, 443 (only through-hole 443 is shown) to pass the target cells and the remaining fluid sample to respective reservoirs. In one embodiment, the cover layer 441 is a glass plate having a sufficient hardness to withstand the friction of electrode pins that are pressed thereon. In another embodiment, the cover layer 441 is a plastic plate. In yet another embodiment, the rotatable substrate 401 may include a low auto-fluorescent material, such as cyclic olefin copolymer (COC), cyclic olefin polymer (COP), polydimethylsilaxane (PDMS), or glass.

Figure 5A:
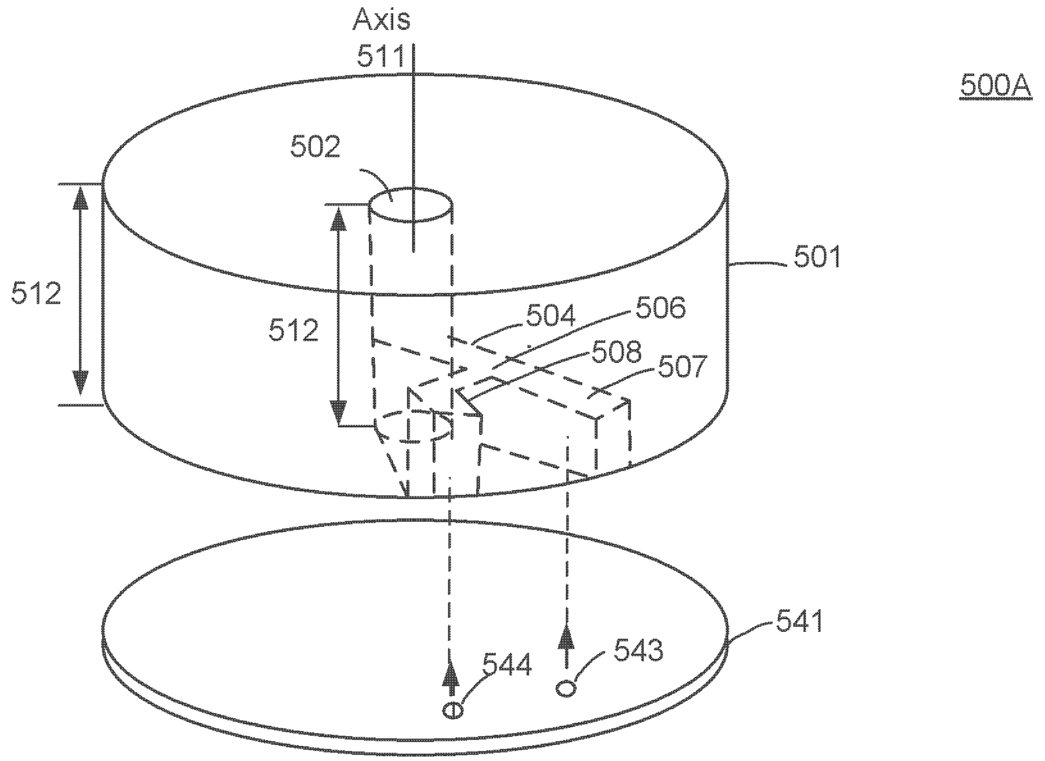
FIG. 5A is an exploded perspective view of an apparatus for sorting cells using a centrifugal force and a dielectrophoretic electric field according to an embodiment of the present disclosure.

FIG. 5A is an exploded perspective view of an apparatus 500A for sorting cells or target units using a centrifugal force and a dielectrophoretic electric field according to an embodiment of the present disclosure. Referring to FIG. 5A, the apparatus 500A includes a rotatable substrate 501 operable to rotate about a rotation axis 511 and a bottom layer 541 disposed on a lower surface of the rotatable substrate 501. The rotatable substrate 501 includes a sample reservoir 502 having a depth or height 512 extending through the rotatable substrate 501, and a flow path (flow channel) 504 coupled to the sample reservoir 502 and having a bifurcation 506 disposed at a location between the sample reservoir 502 and a periphery of the rotatable substrate 501. The bifurcation 506 includes a main channel 507 and a side channel 508. In one embodiment, the flow path 504 extends radially towards a periphery of the rotatable substrate 501, and the main channel 507 is a continuation of the flow path 504 along the same direction toward the periphery of the rotatable substrate 501. The location of the bifurcation 506 is the intersection point of the flow path 504, the main channel 507, and the side channel 508, and is a function of a rotation speed of the rotatable substrate 501, i.e., the location of the bifurcation 506 in relation to the center of the rotatable substrate 501 is determined by the rotation speed of the rotatable substrate. The bottom layer 541 includes a first through hole 543 in fluid communication with the main channel 507 and operable to transfer waste cells in the main channel to a waste reservoir attached thereon, and a second through hole 544 in fluid communication with the side channel 508 and operable to transfer target cells in the side channel to a collection reservoir attached thereon.

Figure 5B:
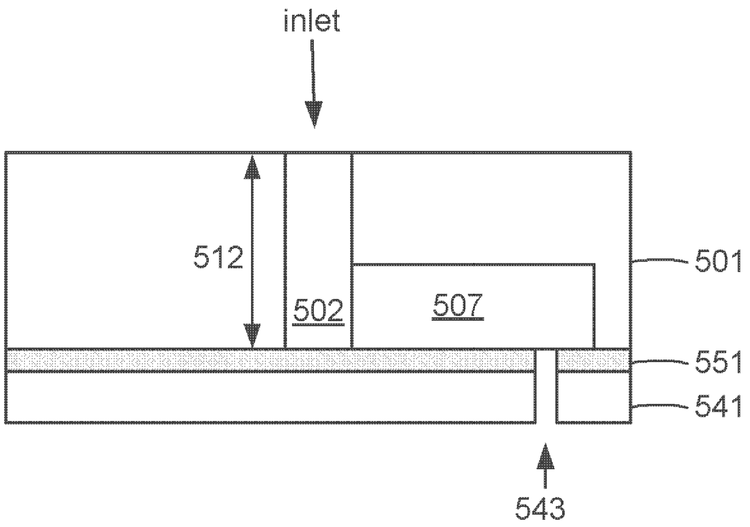
FIG. 5B is a cross-sectional view of the apparatus in FIG. 5A.

FIG. 5B is a cross-sectional view of the apparatus 500A according to an exemplary embodiment of the present disclosure. Referring to FIG. 5B, the bottom layer 541 is attached to the rotatable substrate 501 using an adhesive layer 551 that forms a hermetic seal between the bottom layer 541 and the rotatable substrate 501. In one embodiment, the adhesive layer 551 is compatible with the materials used in the rotatable substrate 501 in order not to react chemically or biochemically with a liquid sample and target cells. In one embodiment, the bottom layer 541 includes a glass, plastic, COC or COP material that can be thermal fusion bonded to the rotatable substrate 501 to ensure hermetic sealing. In one embodiment, the rotatable substrate

501 and the bottom layer have the same material. In this case, the adhesive layer 551 is the thermal fusion bonding layer and has the same material properties of the rotatable substrate 501. It is to be understood that the configuration shown in FIGS. 5A and 5B is merely an illustrative example, other configurations are also possible. For example, the outlets corresponding to the main channel and side channel can be extended through the sidewall of the rotatable substrate 501 and in fluidic communication with respective collection and waste reservoirs.

Figure 6A:
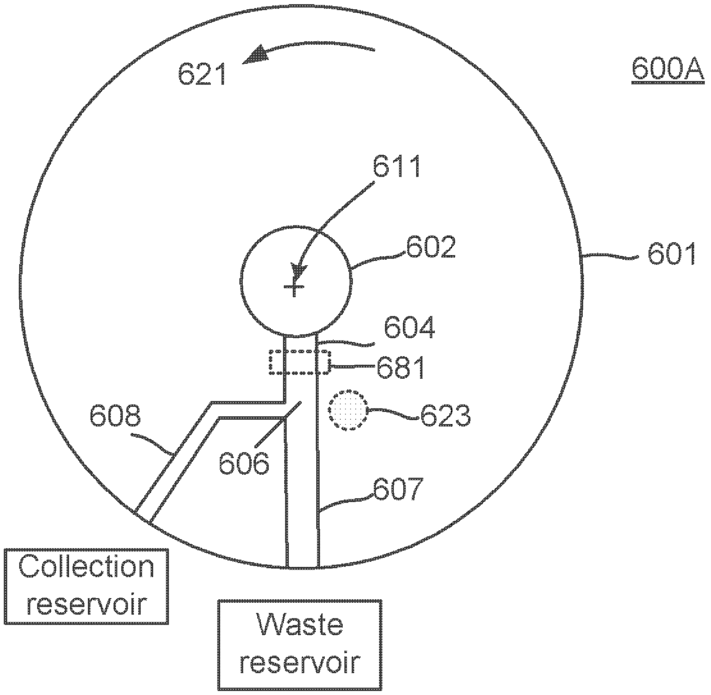
FIG. 6A is a simplified top view diagram illustrating a channel structure of an apparatus for sorting labeled cells using a centrifugal force and a dielectrophoretic electric field according to an embodiment of the present disclosure.

FIG. 6A is a simplified top view diagram illustrating an apparatus 600A for sorting cells using a centrifugal force and a dielectrophoretic electric field according to an embodiment of the present disclosure. The apparatus 600A may be used to sort target cells that are suspended in a liquid sample. The apparatus 600A includes a sample reservoir 602 operable to receive a liquid sample, a flow path 604 coupled to the sample reservoir 602, a bifurcation 606 having a main channel 607 and a side channel 608 branching from the bifurcation. The sample reservoir 602, the flow path 604, the bifurcation 606 including the main channel 607 and the side channel 608 are provided on a rotatable substrate 601. The sample reservoir 602 is centered about a rotation axis 611 that is perpendicular to the rotatable substrate 601.

It will be appreciated that certain processing steps can be performed prior to sorting target cells. For example, the sample may first be treated with fluorophore-labeled antibodies which only conjugate with target cells such as fluorophore labeled antiEpCAM. The target cells thus can be optically differentiated from the rest of the sample. The sample is then loaded into the sample reservoir of the apparatus 600A. A light source (not shown) provides continuous and constant light excitation to illumination a portion of the flow path so that fluorophore-labeled target cells flowing therethrough generate a fluorescence emission signal when excited by light. A light sensor 681 disposed in the vicinity of the flow path 804 (upstream of the bifurcation 608) detects the fluorescence emission signal and provide a trigger signal to a controller, which in turn, provides control signals to a power supply module to generate voltages and currents to the electrode pins to generate a dielectrophoretic electric field to immobilize target cells. The present disclosure provides many advantages and benefits for allowing a user to select the voltages and frequencies to generate a required dielectrophoretic (DEP) electric field to immobilize target cells according to applications. In one embodiment, the electrical signals may have peak magnitudes in the range between tens and hundreds of volt and frequencies in the range between thousands to millions Hz (kHz to MHz).

Referring to FIG. 6A, the rotatable substrate 601 rotates along a counter-clock rotation direction 621 so that the side channel 608 is disposed on the left-hand side of the main channel 607, so that a target cell immobilized by the DEP electric filed will be moved or diverted to the side channel 608 as the rotatable substrate 601 continues to rotate counter-clockwise.

Figure 6B:
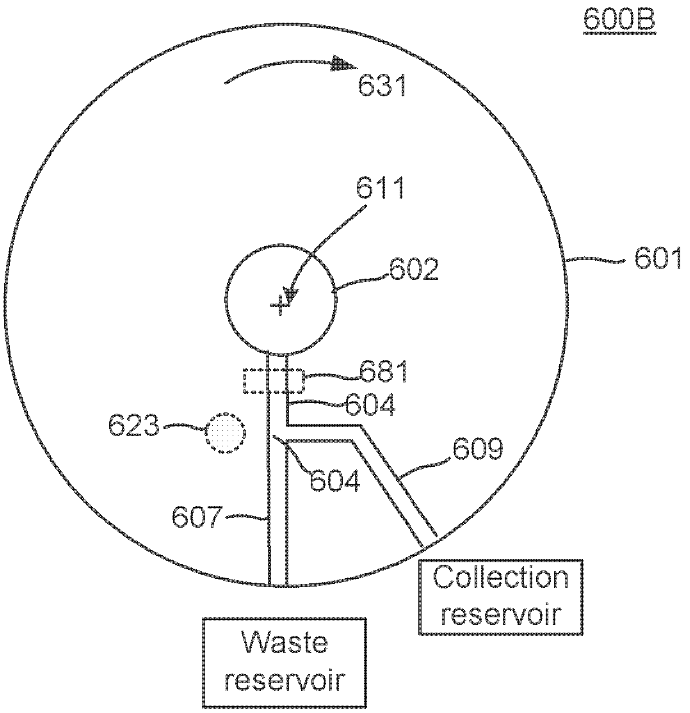
FIG. 6B is a simplified top view diagram illustrating a channel structure of an apparatus for sorting cells using a centrifugal force and a dielectrophoretic electric field according to another embodiment of the present disclosure.

FIG. 6B is a simplified top view diagram illustrating an apparatus 600B for sorting cells using a centrifugal force and a dielectrophoretic electric field according to another embodiment of the present disclosure. Referring to FIG. 6B, the cell sorting apparatus 600B is substantially similar to the apparatus except for the difference described herein. Accordingly, the description provided in relation to the elements illustrated in FIG. 6A is applicable to the elements illustrated in FIG. 6B. The apparatus 600B includes a rotatable substrate 601 operable to rotate along a rotation axis 611. The rotatable substrate 601 includes a sample reservoir 602 operable to receive a liquid sample, a flow patch 604 coupled to the sample reservoir 602, a bifurcation 606 having a main channel 607 and a side channel 609. Referring to FIG. 6B, the apparatus 600B rotates in a clock-wise rotation direction 631. As the apparatus 600B rotates, a centrifugal force drives a liquid in the sample reservoir 602 into the flow path 604. A light sensor 681 disposed in the vicinity of the flow path 604 detects a fluorescence emission signal emitted by fluorophore-labeled target cells and provide a trigger signal to a controller, which in turn, provides control signals to a power supply module to generate voltages and currents to the electrode pins to generate a dielectrophoretic electric field to immobilize target cells, so that the side channel 609 is disposed at the right-hand side of the main channel 607, and so that a target cell immobilized by a DEP electric field will be moved or diverted to the side channel 609 as the rotatable substrate 801 continues to rotate clockwise.

Figure 7:
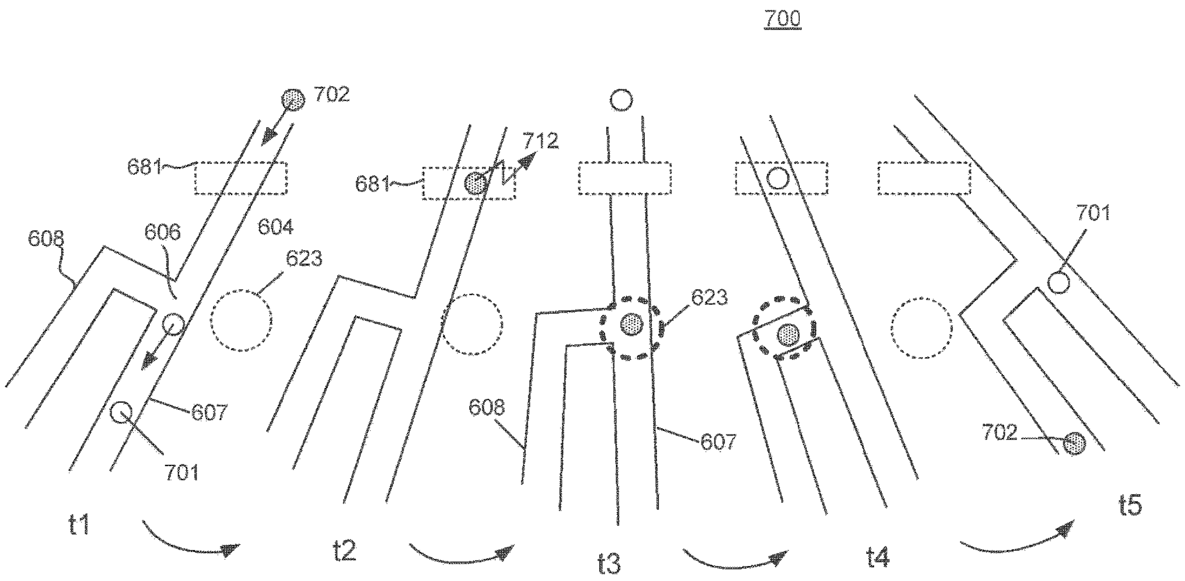
FIG. 7 is a simplified timing diagram of an exemplary cell sorting operation including centrifugation, fluorescence activation, and dielectrophoresis according to an embodiment of the present disclosure.

FIG. 7 is a simplified timing diagram of an exemplary cell sorting operation 700 including centrifugation, fluorescence activation, and dielectrophoresis according to an embodiment of the present disclosure. The cell sorting operation 700 may include a number of steps. A sample is first treated with fluorophore-labeled antibodies which only conjugate with target cells such as fluorophore labeled antiEpCAM. The target cells therefore can be optically differentiated from the rest of the sample. The sample is then loaded into a sample reservoir of a rotatable substrate. At time t1, as the rotatable substrate rotates, it generates a centrifugal force that moves a portion of the sample into a flow path 604 connected to the sample reservoir. A light source continuously illuminates a portion of the flow path 604 with constant light emission. Waste cells (non-target cells) 701 that are not conjugated with fluorophore-labeled antibodies will not trigger activation of the electrode pin 623 (indicated by a dashed circle) and move to the main channel 607, which is an extension of the flow path 604 along a radial direction of the rotatable substrate. At time t2, a fluorophore labeled target cell 702 generates a fluorescence emission signal 712 when excited by the constant light emission. An optical sensor 681 disposed in a vicinity of the flow path (upstream of the bifurcation 606) detects the fluorescence emission signal 712. The sensing of the fluorescence emission signal 712 by the optical sensor 681 triggers the dielectrophoretic pin 623 (DEP pin) downstream turning on and immobilize any cells within its effective region at time t3. The turning on of the DEP pin is indicated by a bold dashed circle. The DEP pin 623 is arranged at the location where the flow channel (flow path) that bifurcates (bifurcation 606) into the waste channel 607 and the collection channel 608. As the rotatable substrate (microfluidic chip) continues to spin, the DEP pins and the immobilized cells "move" away from the flow path 604 and glide into the collection channel 608 at time t4. This way, the targeted cells 702 become isolated from the rest of the sample. As the rotatable substrate continues spinning, the DEP pin moves away from the channel and these isolated cells (target cells) are moved out of the DEP pin working range at time t5. The centrifugal force then drives the isolated cells down to the collection reservoir.

In the exemplary cell sorting operation shown in FIG. 7, only one flow path and one DEP pin are shown, but it is to be understood that the configuration of the rotatable substrate is illustrative only and is chosen for describing the example embodiment and should not be limited.

Figure 8A:
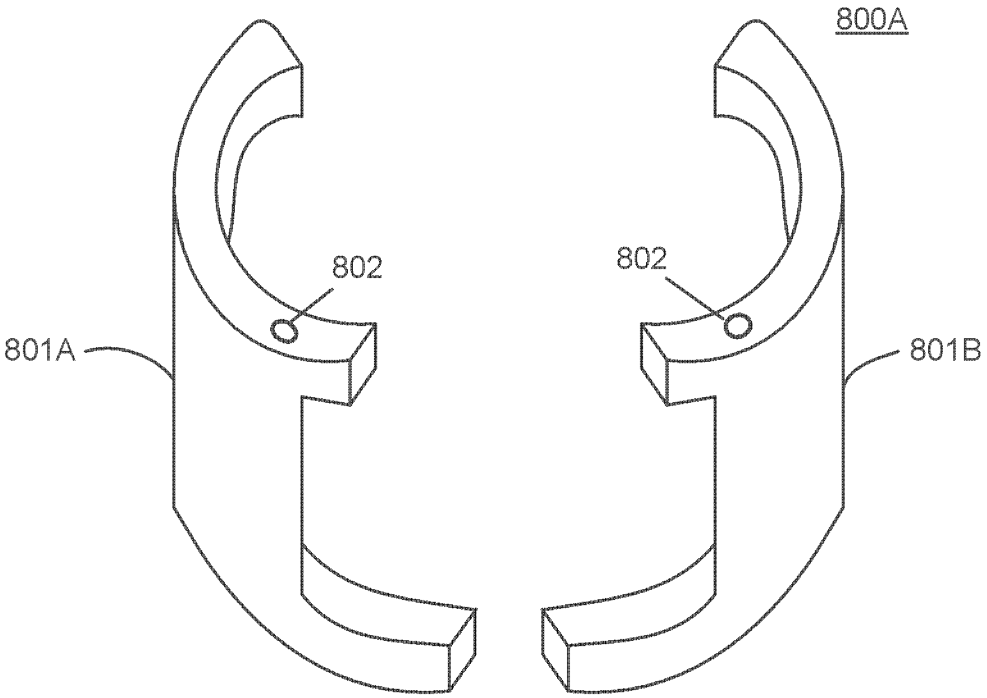
FIG. 8A is a perspective view of a reservoir design for storing cells according to an embodiment of the present disclosure.

FIG. 8A is a perspective view of a reservoir 800A for storing cells according to an embodiment of the present disclosure. Referring to FIG. 8A, the reservoir 800A includes two half-cylindrical hollow portions 801A and 801B, each can be attached along an outer surface of a rotatable substrate. In one embodiment, the inner surface of each of the half-cylindrical hollow portions 801A and 801B can assume the same shape as the outer surface of a rotatable substrate and has an inlet 802 in fluid communication with one of a main channel and a side channel of the rotatable substrate. In one embodiment, the two half-cylindrical hollow portions 801A and 801B can be fabricated using a polymer-based microfabrication process. In one exemplary embodiment, polydimethylsiloxane (PDMS) may be used. In another embodiment, cyclic ofelic polymer (COP) and cyclic olefin copolymer (COC) can be used. The fabrication process may include injection molding. It is to be understood that the configuration shown in FIG. 8A is merely an illustrative example, one will appreciate that other configurations are also possible. For example, the half-cylindrical hollow portions 801A and 801B can have inlets disposed at other locations, such as at a side inner surface matching outlet locations of a rotatable substrate.

Figure 8B:
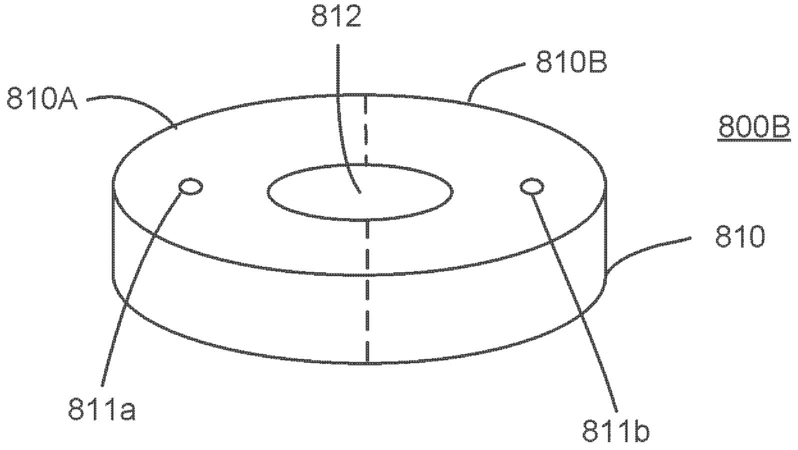
FIG. 8B is a perspective view of a reservoir design for storing cells according to another embodiment of the present disclosure.

FIG. 8B is a perspective view of a reservoir 800B for storing cells according to another embodiment of the present disclosure. The reservoir 800B may include a cylindrical hollow layer 810 that is attached to a rotatable substrate using an adhesive or thermal bonding process. The cylindrical hollow layer 610 may contain two separate hollow portions 810A and 810B, and inlets 811*a* and 811*b*. The two separate hollow portions 810A and 810B each are operable to store target cells and waste cells through the respective inlets 811*a* and 811*b*. The cylindrical hollow layer 810 may also include an opening 812 in its center to pass through a vacuum jack and/or a shaft or a spin motor. It is to be understood that many variations of shape and structure of reservoirs can be made without departing from the scope of the present invention. It will be appreciated that the number of inlets in the collection reservoir and in the waste reservoir can be any integer number. In the exemplary embodiments shown in FIGS. 8A and 8B, two inlets are shown, but it is to be understood that the number is illustrative only and is chosen for describing the example embodiments and should not be limiting.

Figure 9A:
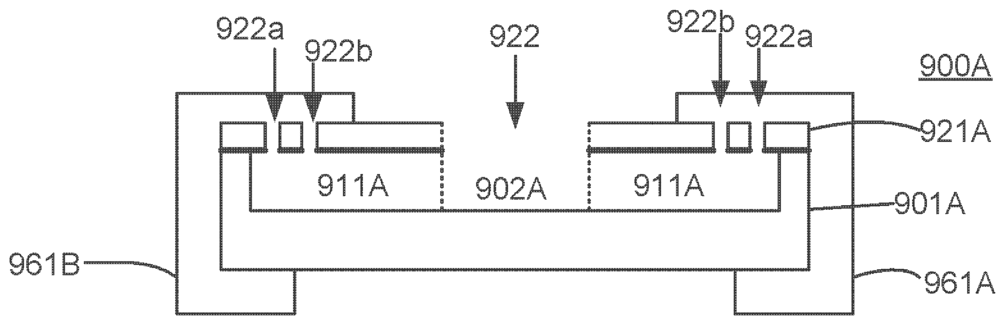
FIG. 9A is a cross-sectional view illustrating an exemplary structure of a cell sorting apparatus including a storage reservoir according to an embodiment of the present disclosure.

FIG. 9A is a cross-sectional view illustrating an exemplary structure of a cell sorting apparatus 900A including a storage reservoir according to an embodiment of the present disclosure. The cell sorting apparatus 900A includes a rotatable substrate 901A and a cover layer 921A disposed on a surface of the rotatable substrate 901A. The rotatable substrate 901A includes a sample reservoir 902A and a flow channel (primary fluidic channel) 911A coupled to the sample reservoir 902A and having a bifurcation (branch point) including a main channel and a side channel branching from the bifurcation as shown in FIG. 4A. The cover layer 921A includes an opening 922 operable to introduce a liquid sample to the sample reservoir 902A, a first through-hole 922*a* in fluid communication with a waste reservoir 961A, and a second through-hole 922*b* in fluid communication with a collection reservoir 961B. The waste reservoir and the collection reservoir may have a semi-cylindrical hollow structure similar to the structure shown and described in FIG. 8A. The waste reservoir and the collection reservoir may be fabricated separately from the rotatable substrate and attached to the rotatable substrate using an adhesive or by thermal bonding.

Figure 9B:
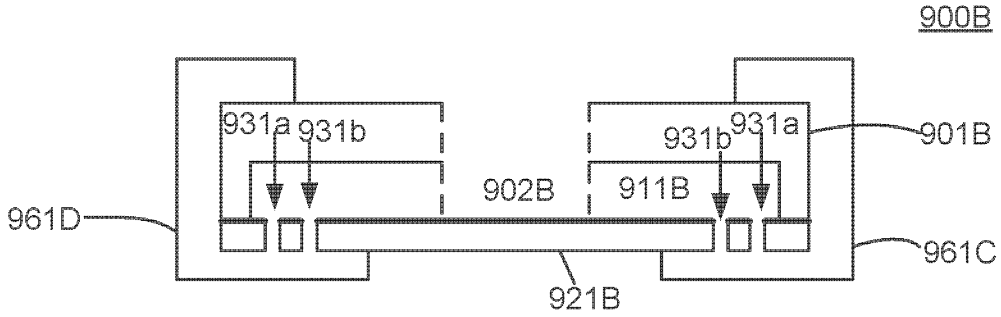
FIG. 9B is a cross-sectional view illustrating an exemplary structure of a cell sorting apparatus including a storage reservoir according to another embodiment of the present disclosure.

FIG. 9B is a cross-sectional view illustrating an exemplary structure of a cell sorting apparatus 900B including a storage reservoir according to another embodiment of the present disclosure. The cell sorting apparatus 900B includes a rotatable substrate 901B and a bottom layer 921B disposed on a bottom surface of the rotatable substrate 901B. The rotatable substrate 901B includes a sample reservoir 902B operable to receive a liquid sample and a flow channel 911B coupled to the sample reservoir 902B and having a bifurcation including a main channel and a side channel as shown in FIG. 5A. The bottom layer 921B has a surface portion that forms the bottom of the sample reservoir 902B, as shown in FIG. 9B. The bottom layer 921B also have a first through-hole 931*a* in fluid communication with a first reservoir 961C and a second through-hole 931*b* in fluid communication with a second reservoir 961D. The first and second reservoirs may be integrated in a single reservoir having two separate hollow portions, as shown and described in FIG. 8B.

Figure 9C:
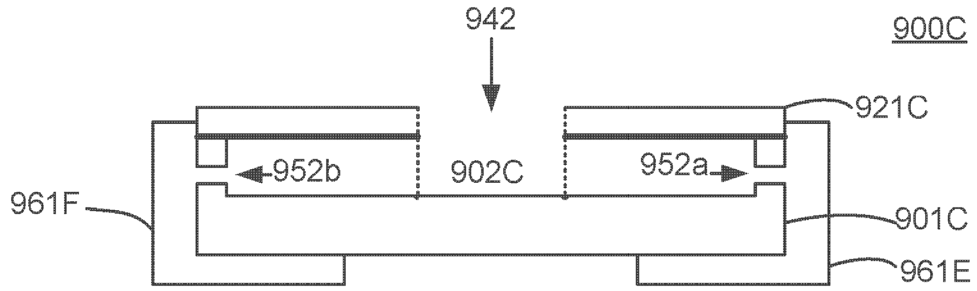
FIG. 9C is a cross-sectional view illustrating an exemplary structure of a cell sorting apparatus including a storage reservoir according to yet another embodiment of the present disclosure.

FIG. 9C is a cross-sectional view illustrating an exemplary structure of a cell sorting apparatus 900C including a storage reservoir according to yet another embodiment of the present disclosure. The cell sorting apparatus 900C includes a rotatable substrate 901C and a cover layer 921C disposed on a surface of the rotatable substrate 901C. The rotatable substrate 901C includes a sample reservoir 902C and a flow channel 911C coupled to the sample reservoir 902C and having a bifurcation including a main channel and a side channel as shown in FIG. 4A. The cover layer 921C includes an opening 942 operable to introduce a liquid sample to the sample reservoir 902C. Different from the structures shown in FIGS. 9A and 9B, the rotatable substrate 901C may have a first through-hole 952*a* in fluid communication with a waste reservoir 961E, and a second through-hole 952*b* in fluid communication with a collection reservoir 961F. The first and second through-holes 952*a* and 952*b* may be formed on a sidewall of the rotatable substrate 901C. It will be appreciated that many alternatives, modifications, and variations for forming the rotatable substrate are enabled by the present disclosure.

Figure 10A:
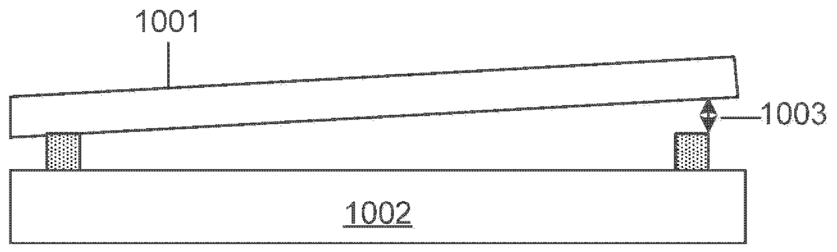
FIG. 10A is a simplified cross-sectional view illustrating bad contact or no contact of electrode pins mounted on a stationary substrate to a rotatable substrate when the two substrates are not correctly mounted.

FIG. 10A is a simplified cross-sectional view illustrating bad contact or no contact of some electrode pins mounted on a stationary substrate to a rotatable substrate when the two substrates are not correctly mounted. Referring to FIG. 10A, an air gap 1003 between a rotatable substrate 1001 and a stationary substrate 1002 does not have an equal distance due to assembly errors when the rotatable substrate 1001 and the stationary substrate 1002 are assembled together. The uneven air gap may cause unreliable electric contacts with a bottom surface of the rotatable substrate 1001.

Figure 10B:
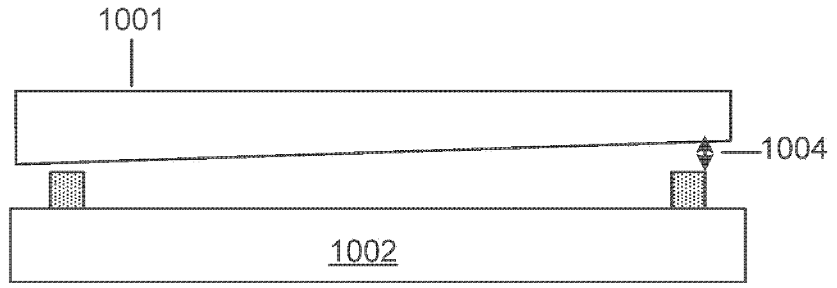
FIG. 10B is a simplified cross-sectional view illustrating bad contact or no contact of electrode pins mounted on a stationary substrate to a rotatable substrate when either the rotatable substrate or the stationary substrate or both substrates have an uneven thickness or uneven surface.

FIG. 10B is a simplified cross-sectional view illustrating bad contact or no contact of electrode pins mounted on a stationary substrate to a rotatable substrate when either the rotatable substrate or the stationary substrate or both substrates have an uneven thickness or uneven surface. Referring to FIG. 10B, the rotatable substrate 1001 may not have an even thickness so that when the rotatable substrate and the stationary substrate 1002 are brought together, some electrode pins mounted on the stationary substrate 1002 may not have reliable contact with the bottom surface of the rotatable substrate 1001, as indicated by an air gap 1004.

Figure 10C:
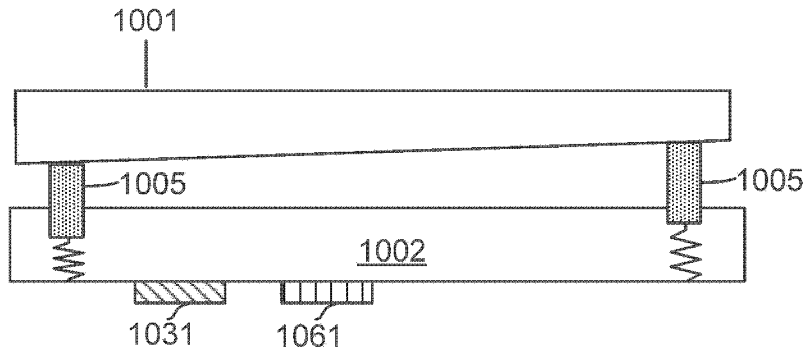
FIG. 10C is a simplified cross-sectional view illustrating good contact of electrode pins mounted on a stationary substrate to a rotatable substrate according to an embodiment of the present disclosure.

FIG. 10C is a simplified cross-sectional view illustrating good contact of electrode pins mounted on a stationary substrate to a rotatable substrate according to an embodiment of the present disclosure. Embodiments of the present disclosure provide a solution that solves the unreliable electric contacts due to assembly error or an uneven thickness in a conventional method. Referring to FIG. 10C, an array of spring-loaded connector pins 1005 are mounted on the stationary substrate 1002. The spring-loaded connector pins each have a sufficient length to compensate for the assembly errors and/or the uneven thickness of the rotatable substrate and/or the stationary substrate when they are brought together. In one embodiment, a power supply module 1031 and a controller 1061 may also be mounted on the stationary substrate 1002.

Figure 11:
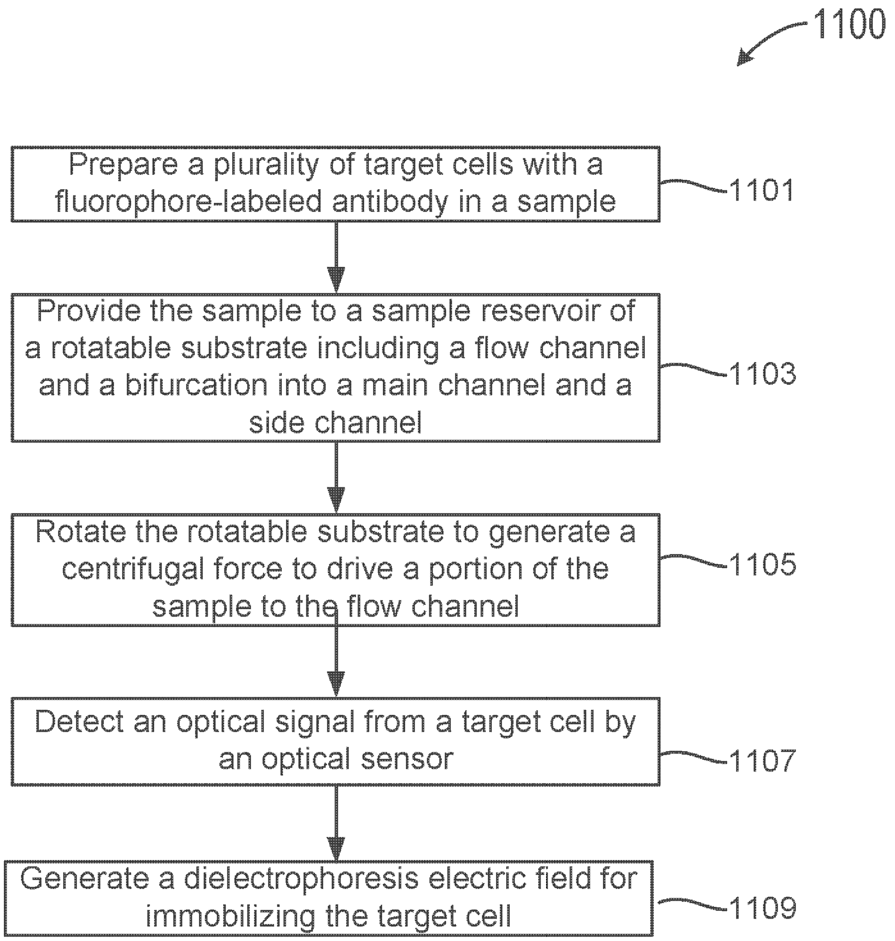
FIG. 11 is a simplified flowchart illustrating a method of sorting cells according to an embodiment of the present disclosure.

FIG. 11 is a simplified flowchart illustrating a method 1100 of sorting cells according to an embodiment of the present disclosure. The method 1100 includes preparing a plurality of target cells with a fluorophore-labeled antibody in a sample having target cells and waste (non-target) cells (block 1101). The method 1100 also includes providing the sample to a sample reservoir of a rotatable substrate. The rotatable substrate includes a flow path (primary fluidic channel) coupled to the sample reservoir and extending radially away from the sample reservoir and a bifurcation (branch point) having a main channel extending along the radial direction of the flow channel and a side channel (block 1103). The method 1100 further includes rotating the rotatable substrate to generate a centrifugal force to drive a portion of the sample from the sample reservoir into the flow path (block 1105). The method 1100 also includes detecting an optical signal emitted from a target cell by an optical sensor (1107). For example, the fluorophore-labeled target cell emits an fluorescence emission signal when it is illuminated by excitation light having a substantially constant intensity. In one embodiment, the spectrum wavelengths of the excitation light with constant intensity are ranging from ultraviolet spectrum to visible light. Upon detecting fluorescence emission signal (e.g., having a UV emission spectrum), the method 1100 includes providing an electrical signal to a connector pin disposed in a vicinity of the bifurcation to generate a dielectrophoresis (DEP) electric field to immobilize the target cell (block 1109). As the rotatable substrate continues rotating, the immobilized target cell is moved (diverted) to the side channel and to a collection reservoir using the centrifugal force.

Figure 12A:
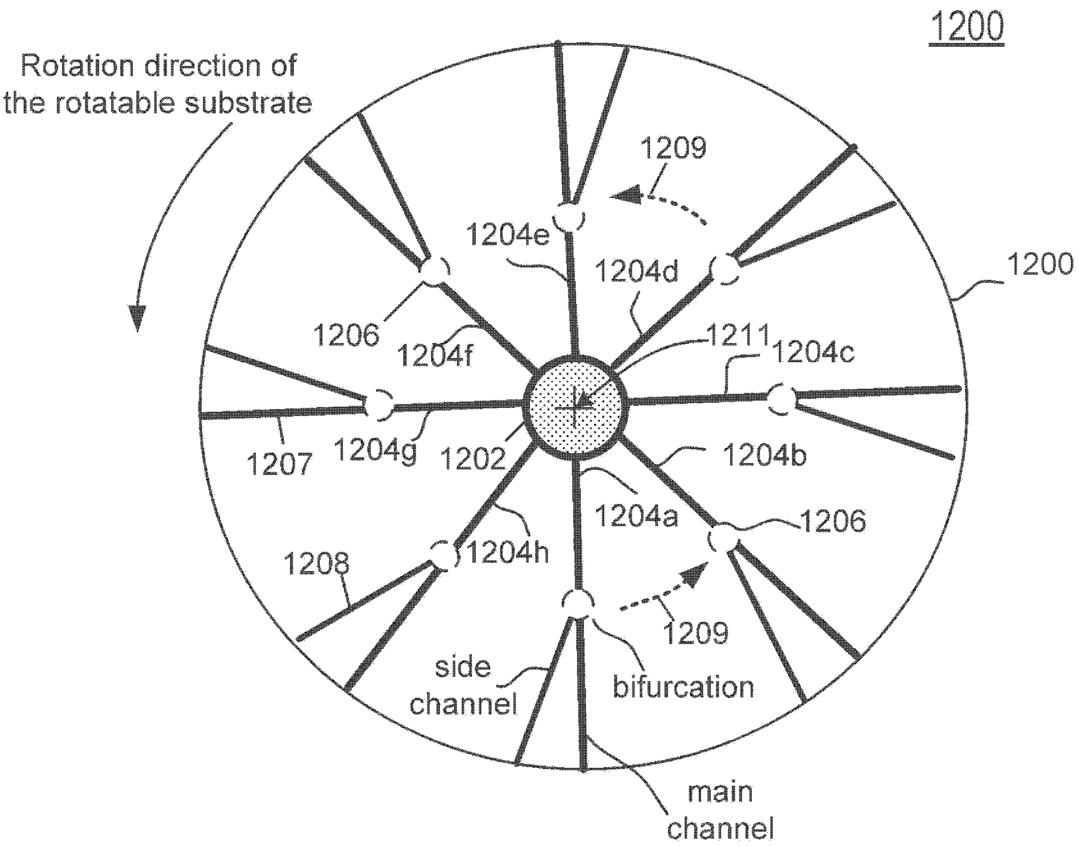
FIG. 12A is a top view of an exemplary rotatable substrate comprising a plurality of flow paths, each having a bifurcation into a main channel and a side channel, according to an embodiment of the present disclosure.

FIG. 12A is a top view of an exemplary rotatable substrate 1200 comprising a plurality of flow paths, each having a bifurcation into a main channel and a side channel, according to an embodiment of the present disclosure. In the example shown in FIG. 12A, the rotatable substrate 1200 has a sample reservoir 1202 at its center and eight flow paths 1204*a* to 1204*h* in fluid communication with the sample reservoir 1202 and extending radially away from the sample reservoir, each of the flow paths includes a bifurcation 1206 into a main channel 1207 and a side channel 1208. It will be appreciated that the number is exemplary and can vary dependent on the desired application, i.e., any number of flow channels can be provided on the rotatable substrate 1200. In the example shown, the rotatable substrate rotates in a counter-clockwise direction about a vertical axis 1211, so that the side channels are located on the left side of the main channels which extend radially along the same direction as the flow paths. In one embodiment, the rotatable substrate 1200 rotates from the axis of rotation at about 1500 rotations per minute (RPM). In the exemplary embodiment, the bifurcation (also referred to as branch point, separation, or separation point) 1206 moves in a direction along a circular traveling path 1209.

Also shown in FIG. 12A is a plurality of electrodes each being disposed in the vicinity of one of the bifurcations for generating a DEP electric field to immobilize a target cell flowing through flow path.

Figure 12B:
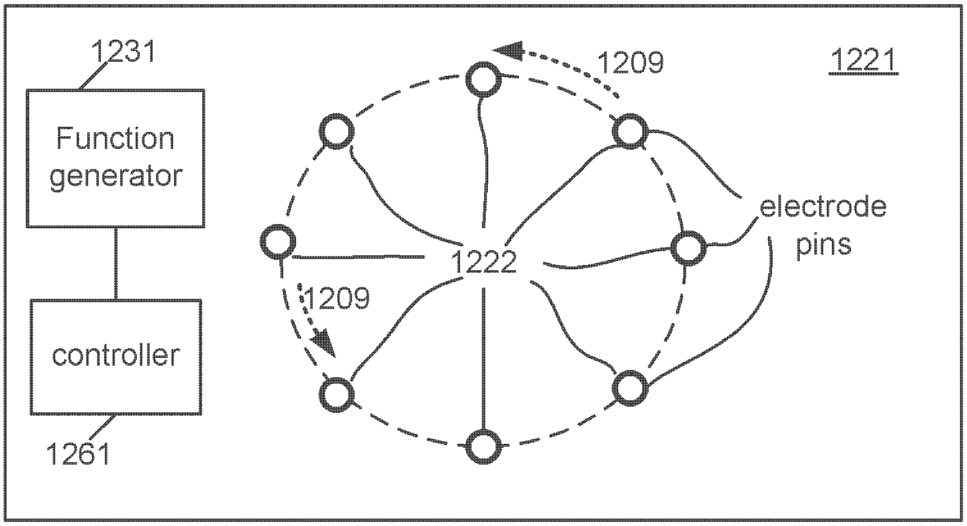
FIG. 12B is a top view of an exemplary stationary substrate including a plurality of electrode pins mounted thereon according to an embodiment of the present disclosure.

FIG. 12B is a top view of an exemplary stationary substrate 1221 including a plurality of electrode pins mounted thereon according to an embodiment of the present disclosure. Referring to FIG. 12B, a set of eight electrode pins 1222 are arranged in a ring pattern and mounted on the stationary substrate 1221. The electrode pins 1222 are disposed on a circumference having the same radius matching the bifurcation locations. In one embodiment, the electrode pins are spring-loaded to ensure a reliable contact with the rotatable substrate. A function generator module 1231 and a controller 1261 may also be disposed on the stationary substrate 1221 and configured to provide AC electrical signals to the electrode pins for generating a DEP electric field at appropriate times. The electrode pins are individually addressable. In one embodiment, the AC electrical signals have a peak magnitude in the range between tens to several hundreds of volts (V) and a frequency in the range between thousands, hundreds of thousands, or even millions Hz. In one embodiment, an optical sensor for detecting a fluorescence emission signal from target cells may also be disposed on the stationary substrate 1221. According to the present disclosure, the cell sorting apparatus has a great scalability either by extending the run time or multiplexing the flow channels. It will be appreciated that the number of the flow channels and the number of the electrode pins can be the same or different. In one embodiment, the electrode pins are arranged in a vicinity of the circular traveling path 1209 of the bifurcation (branch point, separation, or separation point) 1206. In one embodiment, the electrode pins 1222 are arranged outside of the circular traveling path. In another embodiment, the electrode pins 1222 are arranged inside of the circular traveling path.

Figure 13A:
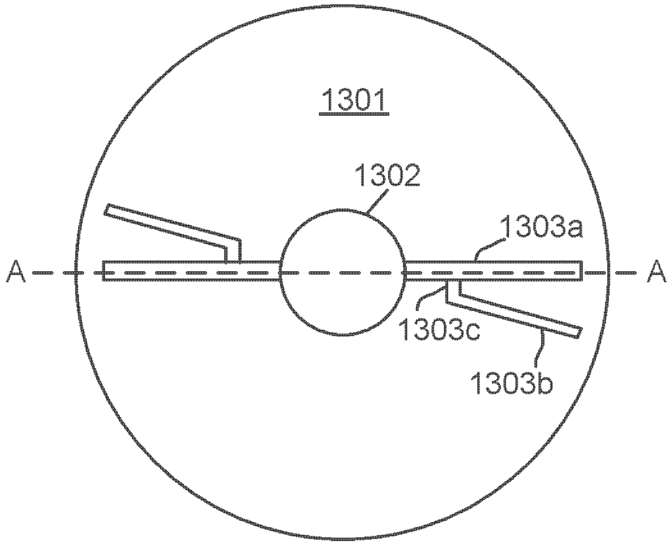
FIGS. 13A to 13G are simplified cross-sectional views of steps of a method of manufacturing a rotatable substrate according to an embodiment of the present disclosure.

FIGS. 13A through 13G are intermediate steps of an exemplary method of manufacturing a rotatable substrate using photolithography according to an embodiment of the present disclosure. FIG. 13A is a top view of a patterned mask 1301 for forming a rotatable substrate according to an embodiment of the present disclosure. The patterned mask 1301 has a circular pattern 1302 in the center and a first rectangular pattern 1303*a* and a second rectangular pattern 1303*b* connected by a third rectangular pattern 1303*c*. In one embodiment, the circular pattern 1302 serves to form a sample reservoir, the first rectangular pattern 1303*a* serves to form a flow path and a main channel, the second rectangular pattern 1303*b* serves to form a side channel, and the third rectangular patter 1303*c* serves to form a bifurcation between the flow path, the main channel, and the side channel.

Figure 13B:
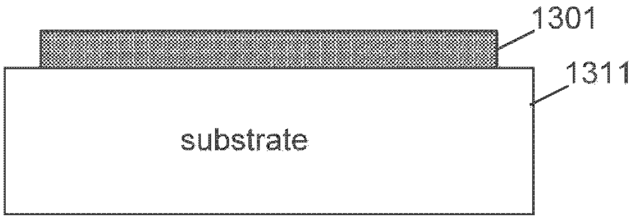
Figure 13C:
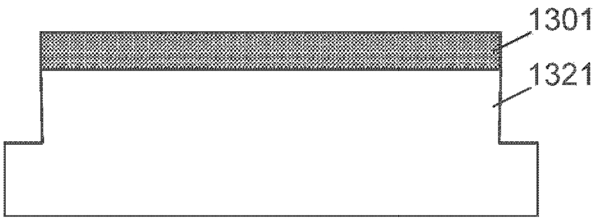
Figure 13D:
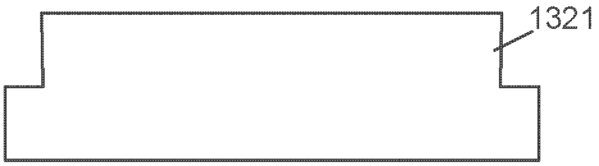
Figure 13E:
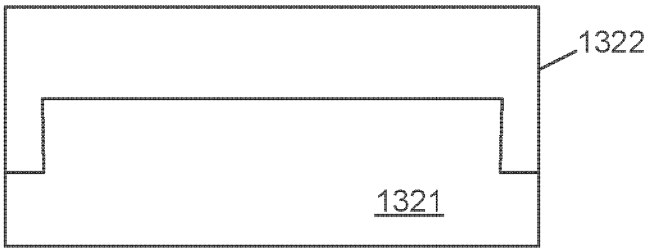
Figure 13F:
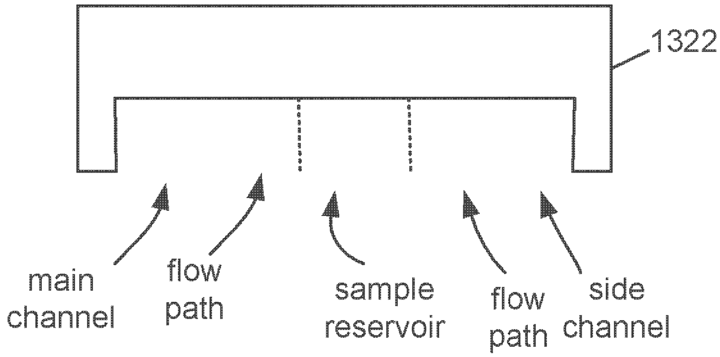
Figure 13G:
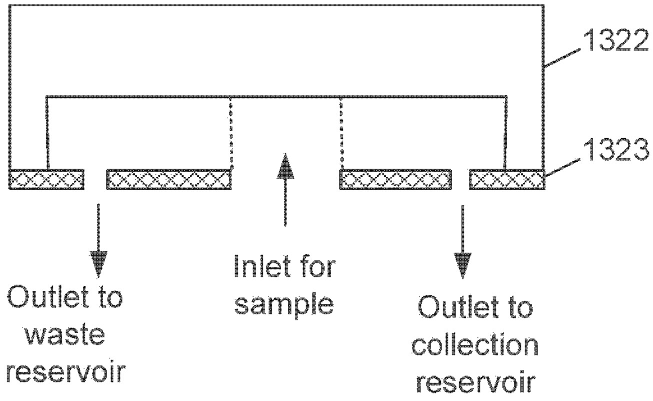

FIG. 13B is a cross sectional view illustrating a silicon substrate 1311 having a patterned mask, such as the patterned mask 1301 formed thereon, along the line AA of the patterned mask in FIG. 13A. An etch process is performed using the patterned mask 1301 to obtain an etched silicon substrate 1321, as shown in FIG. 13C. The patterned mask is then removed to obtain a patterned silicon substrate 1321, as shown in FIG. 13D. The thus formed silicon substrate can be serve as a master stamp or master mold for forming a rotatable substrate. In one embodiment, a thermoplastic material, such as cyclic olefin copolymer (COC) or cyclic olefin polymer (COP), can be injected onto the patterned silicon substrate 1321 to produce a polymer replica 1322, as shown in FIG. 13E. The polymer replica 1322 is removed from the master mold 1321. The thus formed polymer replica 1322 includes the sample reservoir, the flow path, the bifurcation, the main channel, and the side channel, as shown in FIG. 13F. An additional thermoplastic material layer 1323 is then bonded by thermal fusion to hermetically seal the polymer replica 1322, thereby forming a rotatable substrate. The thermoplastic material layer 1323 includes openings corresponding to an inlet for injection of a biological sample, and outlets for target cells to a collection reservoir and waste (non-target) cells to a waste reservoir.

The collection reservoir and the waste reservoir can be manufactured using a similar process and bonded to the rotatable substrate by thermal fusion. The use of COC or COP material is advantageous over PDMS (polydimethysiloxane), which is a soft elastomer material, thereby lacking rigidity. COC and COP have high optical transmissivity and glass-like properties, and can be mass produced at a low unit cost. In particular, the COC and COP substrates have excellent optical transmissivity in the visible light spectrum range, but also in the mid- and near UV spectral ranges compared with PDMS.

Each of the main channel and the side channel can be defined by three dimensions: width, height, and length. In one embodiment, the main channel has a width of about 200 μm, a height of about 100 μm, and a length of about 23 mm. The side channel has a width of about 70 μm, a height of about 100 μm, and a length of about 14 mm. The sample reservoir has a radius of about 10 mm to 30 mm, and the bifurcation is disposed about 7 mm from the center of the rotatable substrate. In one embodiment, the rotatable substrate has a radius in the range between 15 mm and 50 mm, preferable between 20 mm and 35 mm. It is to be understood that the dimensions and shapes provided herein are exemplary and not limiting. It will be appreciated that other dimensions and shapes are also possible. For example, the rotatable substrate can have a circular shape, an polygonal shape, e.g., square, octagonal, and the like.

A rotatable substrate provided according to some embodiments of the present disclosure includes a sample reservoir and a flow path in fluid communication with the sample reservoir and extending radially away from the sample reservoir. The flow path includes a bifurcation having a main channel extending in the same direction of the flow path and a side channel. The sample reservoir, the flow path, the main channel and the side channel can be fabricated in one process step. In some embodiments, the flow path, the main channel and the side channel are then covered by a second layer, which includes an inlet for injecting a sample to the sample reservoir, and outlets for moving target cells and waste cells to respective collection reservoir and waste reservoir. In other embodiments, a second layer serves as a bottom plate forming the bottom of the sample reservoir. In some embodiments, the second layer may have the same material as the rotatable substrate. It will be appreciated that the sample reservoir, the flow path, the main channel, and the side channel can have a variety of shapes and sizes.

Using embodiments of the present disclosure, it is possible to separate target cells or target particles from non-target cells or non-target particles through a DEP electric field induced by electrode pins arranged in a vicinity of flow channel bifurcations in a rotatable substrate. The electrode pins can be arranged above or below the bifurcations for generating an electric field to immobilize target cells which are then diverted to a side channel while non-target cells continue to flow through a main channel by a centrifugal force. In some embodiments, a collection reservoir is disposed at a distal end of the side channel and a waste reservoir is disposed at a distal end of the main channel along a periphery of the rotatable substrate. In one embodiment, the collection reservoir and the waste reservoir each have an approximately round shape disposed along the periphery of the rotatable substrate.

While the advantages and embodiments of the present invention have been depicted and described, there are many more possible embodiments, applications and advantages without deviating from the scope of the inventive ideas described herein. It will be apparent to those skilled in the art that many modifications and variations in construction and widely differing embodiments and applications of the present invention will suggest themselves without departing from the spirit and scope of the invention. For example, embodiments of the present disclosure may be employed in applications such as cell sorting based on differentiating cell sizes or morphologies without utilizing fluorescent labels, sorting bacteria from drinking water after labeling the bacteria with antibody and fluorophore conjugated gold nanoparticles, and the like.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An apparatus for sorting cells, the apparatus comprising:

a rotatable substrate comprising:

a sample reservoir for storing a sample comprising target cells and non-target cells; and at least one flow path coupled to the sample reservoir and extending away from the sample reservoir, the at least one flow path comprising a separation into a main channel and a side channel; and a stationary substrate comprising:

a power supply module configured to provide at least one electrical signal; and at least one height adjustable electrode pin coupled to the power supply module and configured to receive the at least one electrical signal, the at least one height adjustable electrode pin being disposed in a vicinity of the separation and in physical contact with the rotatable substrate when the rotatable substrate and the stationary substrate are brought together.

2. The apparatus of claim 1, wherein the at least one height adjustable electrode pin is a spring-loaded guide pin.

3. The apparatus of claim 1, wherein the at least one height adjustable electrode pin comprises a plurality of height adjustable electrode pins that are individually addressable by the power supply module.

4. The apparatus of claim 1, further comprising a spinner device coupled to the rotatable substrate.

5. The apparatus of claim 1 further comprising an optical sensor disposed between the sample reservoir and the separation and configured to detect a fluorescent emission signal of a target cell.

6. The apparatus of claim 5, further comprising a controller coupled to the power supply module and configured to provide a control signal to the power supply module in response to the detected fluorescent emission signal.

7. A method of sorting cells in a sample comprising non-target cells and target cells, the method comprising:

preparing the target cells in the sample with a fluorophore-labeled antibody;

providing the sample to a sample reservoir of a rotatable substrate having a flow path coupled to the sample reservoir, wherein the flow path comprises a separation into a main channel and a side channel;

rotating the rotatable substrate to generate a centrifugal force to drive a portion of the sample from the sample reservoir into the flow path;

detecting an optical signal from a target cell by an optical sensor; and generating an electric field for immobilizing the target cell in response to the detected optical signal.

8. The method of claim 7, further comprising:

diverting the target cell to the side channel as the flow path moves away from the electric field; and moving the target cell along the side channel to a collection reservoir using the centrifugal force.

9. The method of claim 7, further comprising:

moving a waste cell along the main channel to a waste reservoir using the centrifugal force.

10. A sorting system, the system comprising:

a rotatable substrate comprising at least one fluidic channel extending towards a periphery of the rotatable substrate and at least one branch fluidic channel extending off of the fluidic channel from a branch point;

a detector configured to detect target units in a fluid in the fluidic channel at or upstream of the branch point;

an electric field source configured to generate an electric field at or proximate a circular traveling path of the branch point in response to the detector detecting a target unit, wherein the system is configured to:

rotate the rotatable substrate to cause the fluid to flow through the fluidic channel towards the periphery of the rotatable substrate, and activate the electric field source in response to the detector detecting a target unit in the fluid such that the generated electric field facilitates diversion of the detected target into the branch fluidic channel.

11. The system of claim 10, further comprising a stationary substrate coupled to the rotatable substrate through at least one electrode pin, wherein the at least one electrode pin is disposed at a vicinity of the branch point and operable to generate the electric field.

12. The system of claim 10, wherein the detector is an optical sensor operable to detect fluorescence emission of the target units.

* * * * *